(12) United States Patent
Tadokoro et al.

(10) Patent No.: US 12,743,829 B2
(45) Date of Patent: Sep. 22, 2026

(54) IMAGE PROCESSING APPARATUS

(71) Applicant: TOYOTA JIDOSHA KABUSHIKI KAISHA, Toyota (JP)

(72) Inventors: Yoshiyuki Tadokoro, Toyota (JP); Shinichi Takeuchi, Toyota (JP); Shingo Noritake, Owariasahi (JP); Akira Murakami, Kasugai (JP); Ryo Yanagawa, Nagoya (JP); Yutaka Kuwajima, Wako (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 299 days.

(21) Appl. No.: 18/437,977

(22) Filed: Feb. 9, 2024

(65) Prior Publication Data

US 2024/0275904 A1 Aug. 15, 2024

(30) Foreign Application Priority Data

Feb. 13, 2023 (JP) ................................ 2023-020144

(51) Int. Cl.
*G06T 11/60* (2026.01)
*G06T 5/50* (2006.01)
(Continued)

(52) U.S. Cl.
CPC ............. *H04N 1/6002* (2013.01); *G06T 5/50* (2013.01); *G06T 5/70* (2024.01); *G06T 7/194* (2017.01);
(Continued)

(58) Field of Classification Search
CPC ........... H04N 1/6002; G06T 5/50; G06T 5/70; G06T 7/194; G06T 7/90; G06T 11/60;
(Continued)

(56) References Cited

U.S. PATENT DOCUMENTS 11,858,122 B2 * 1/2024 Duke ..................... B25J 9/1674
2015/0317787 A1 * 11/2015 Badawy .................... G06T 7/90
382/152
(Continued)

FOREIGN PATENT DOCUMENTS

CN 102797727 A * 11/2012 ........... G06T 7/0002
CN 111209876 A * 5/2020 ............. G06V 20/10
(Continued)

*Primary Examiner* — Jose L Couso
(74) *Attorney, Agent, or Firm* — Finnegan, Henderson, Farabow, Garrett and Dunner, LLP

(57) ABSTRACT

An image processing apparatus includes a control unit configured to execute processing for converting a red green blue (RGB) format in which colors of a first reference image not including liquid leakage are expressed into a hue saturation value (HSV) format, and for extracting a second reference image consisting of S components from the first reference image having colors expressed in the HSV format, processing for converting the RGB format in which colors of a first detection target image are expressed into the HSV format, and extracting a second detection target image consisting of S components from the first detection target image having colors expressed in the HSV format, and processing for generating a third reference image and a third detection target image by smoothing the second reference image and the second detection target image, respectively.

3 Claims, 7 Drawing Sheets

(51) Int. Cl.

| | |
|---|---|
| ***G06T 5/70*** | (2024.01) |
| ***G06T 7/194*** | (2017.01) |
| ***G06T 7/90*** | (2017.01) |
| ***G06V 10/56*** | (2022.01) |
| ***H04N 1/60*** | (2006.01) |

(52) U.S. Cl.
CPC ................ *G06T 7/90* (2017.01); *G06T 11/60* (2013.01); *G06V 10/56* (2022.01); *G06T 2207/10024* (2013.01); *G06T 2207/20224* (2013.01)

(58) Field of Classification Search
CPC . G06T 2207/10024; G06T 2207/20224; G06T 7/0004; G06T 7/001; G06T 7/002; G06T 2207/30108; G06T 2207/10016; G06T 2207/10036; G06T 2207/10064; G06T 2207/30232; G06V 10/56; G06V 10/761; B25J 13/087; B25J 19/023; B25J 9/1674; B25J 9/1697; G01M 3/04; G01N 21/84; G01N 1/10; F02B 77/08; F15B 19/005; Y02A 50/20
See application file for complete search history.

(56) References Cited

U.S. PATENT DOCUMENTS

| | | | | |
|---|---|---|---|---|
| 2022/0057291 | A1* | 2/2022 | Lu | G06T 7/0008 |
| 2022/0327731 | A1* | 10/2022 | Alalouni | G06T 7/136 |
| 2024/0212121 | A1* | 6/2024 | Govrin | G06T 7/0004 |

FOREIGN PATENT DOCUMENTS

| | | | | | |
|---|---|---|---|---|---|
| CN | 113095114 | A | * | 7/2021 | G06F 18/22 |
| CN | 113743454 | A | * | 12/2021 | G06F 18/214 |
| CN | 114519698 | A | * | 5/2022 | G06F 18/253 |
| CN | 114627316 | A | * | 6/2022 | G06T 7/41 |
| CN | 115311443 | A | * | 11/2022 | G06N 3/04 |
| JP | H 08-201212 | A | | 8/1996 | |
| JP | 2021-157566 | A | | 10/2021 | |
| JP | 7096780 | B | | 7/2022 | |

* cited by examiner

IMAGE PROCESSING APPARATUS

CROSS-REFERENCE TO RELATED APPLICATION

This application is based upon and claims the benefit of priority of the prior Japanese Patent Application No. 2023-020144, filed on Feb. 13, 2023, the entire contents of which are incorporated herein by reference.

TECHNICAL FIELD

The present disclosure relates to an image processing apparatus.

BACKGROUND

An oil leakage detection device for detecting oil leakage from an oil-filled device is known. The oil leakage detection device includes a light source that irradiates the oil-filled device with light, an image device that captures an image of the oil-filled device, a control device that controls operations of the light source and the image device, and an image processing device that processes the captured image. When a three layer structure of luminance including a bright portion and a dark portion having different luminance is observed in a captured image, the image processing apparatus recognizes the brightest portion and the dark portion adjacent to the brightest portion on the image as the oil leakage adhesion portion (see, for example, Japanese Patent No. 7096780).

Incidentally, when the above-described luminance is used in detection of liquid leakage such as oil leakage or liquid refrigerant leakage, the detection accuracy of liquid leakage might decrease. For example, in a case of observing the three layer structure of luminance in a dark and narrow space and in a case of observing the three layer structure of luminance in a bright and wide space, different management is required for the light source in order to control luminance. That is, the management of the light source changes.

In such a state where the management of the light source changes, if the management of the light source is managed incorrectly, the luminance is not appropriately controlled according to the state of the space, so that the detection accuracy of the liquid leakage might decrease.

SUMMARY

It is therefore an object of the present disclosure to an image processing apparatus that suppresses a decrease in detection accuracy of liquid leakage.

The above object is achieved by an image processing apparatus including a control unit configured to execute: processing for converting a red green blue (RGB) format in which colors of a first reference image not including liquid leakage are expressed into a hue saturation value (HSV) format, and for extracting a second reference image consisting of S components from the first reference image having colors expressed in the HSV format; processing for converting the RGB format in which colors of a first detection target image are expressed into the HSV format, and extracting a second detection target image consisting of S components from the first detection target image having colors expressed in the HSV format; processing for generating a third reference image and a third detection target image by smoothing the second reference image and the second detection target image, respectively; and processing for detecting the liquid leakage on a basis of a comparison result between the third reference image and the third detection target image.

In the above-described configuration, the control unit may be configured to execute processing for detecting a specific area in which the liquid leakage occurs on a basis of a first background subtraction image which is a result of processing using a background subtraction method on the third reference image and the third detection target image.

In the above-described configuration, the control unit may be configured to execute processing for generating a second background subtraction image by removing noise from the first background subtraction image on a basis of a predetermined noise removal method for removing noise from an image, and for detecting the specific area in which the liquid leakage occurs on a basis of the second background subtraction image.

In the above-described configuration, the control unit may be configured to execute processing for determining a liquid type of the liquid leakage on a basis of the specific area and of a learned model obtained by machine-learning an oil color representing a color of oil in the RGB format and a non-oil color representing a color of liquid excluding the oil in the RGB format.

In the above-described configuration, the control unit may be configured to execute processing for acquiring the first reference image and the first detection target image in which colors are expressed in the RGB format from an imaging device that captures an imaging target through which a liquid circulates, and for displaying a determination result of the liquid type on a display device.

DETAILED DESCRIPTION

Hereinafter, embodiments of the present disclosure will be described with reference to the drawings.

Figure 1:
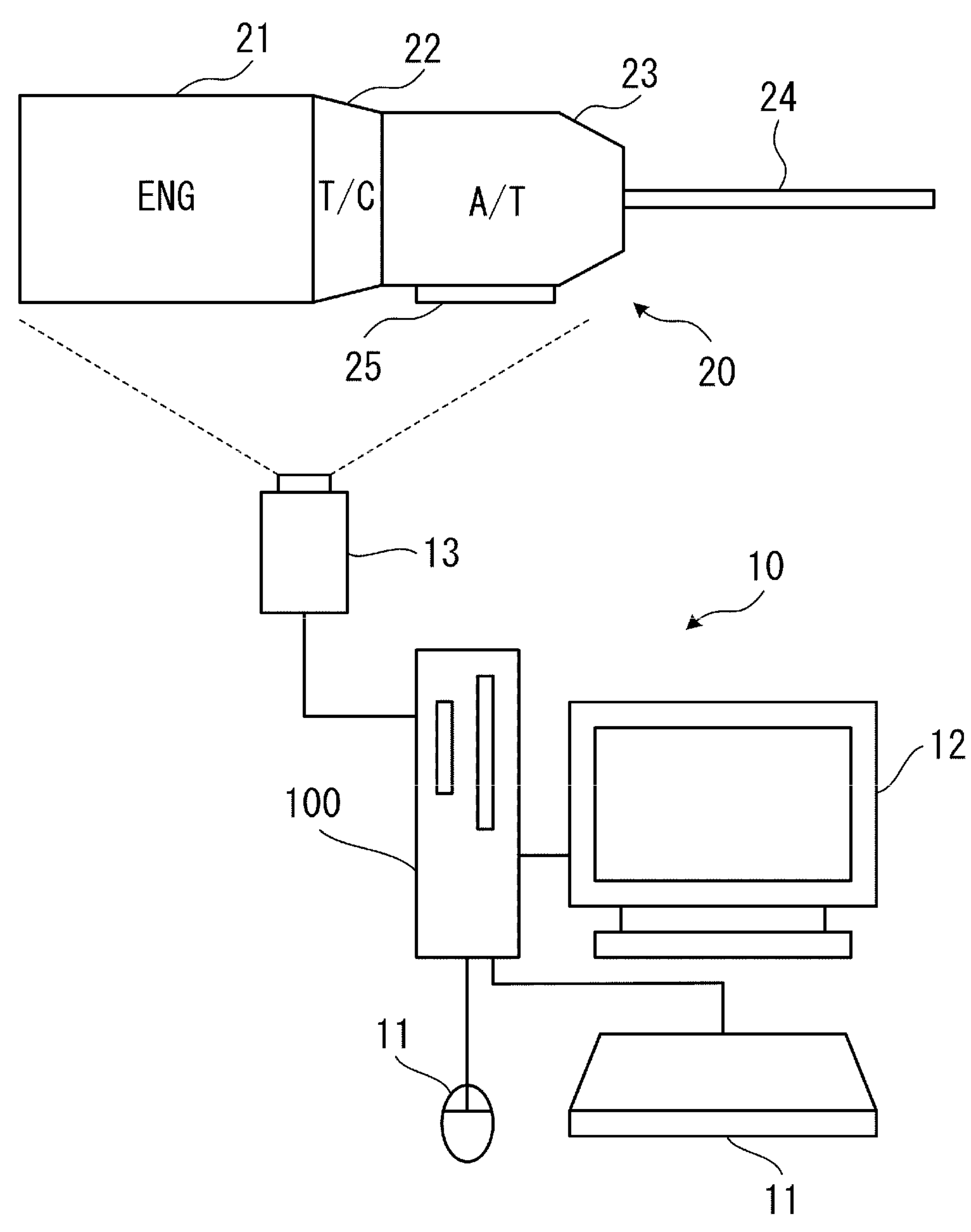
FIG. 1 is a view illustrating an application example of an image processing apparatus.

First, an application example of an image processing apparatus 100 will be described with reference to FIG. 1. The image processing apparatus 100 is included in a terminal device 10. FIG. 1 illustrates a stationary personal computer (PC) as an example of the terminal device 10. However, the terminal device 10 may be a mobile terminal such as a laptop PC or a smart terminal. The smart terminal includes, for example, a smartphone, a tablet terminal, and the like.

An input device 11, a display device 12, and an image device 13 are connected to the image processing apparatus 100. The input device 11 includes, for example, a keyboard, a mouse, and a touch panel. The display device 12 includes, for example, a liquid crystal display. The image device 13 includes, for example, a video camera that captures moving images in color and a still camera that continuously captures still images in color. When the terminal device 10 is a mobile terminal, the image device 13 is incorporated in the mobile terminal.

An imaging target 20 is disposed in an imaging range of the image device 13. The imaging target 20 includes, for example, an engine 21, a torque converter 22, and an automatic transmission 23. The torque converter 22 is coupled to the engine 21. The automatic transmission 23 is coupled to the torque converter 22. A propeller shaft 24 is connected to the automatic transmission 23. The automatic transmission 23 is provided with a hydraulic control circuit 25.

Although a part of the imaging target 20 is included in the imaging range in FIG. 1, the entire imaging target 20 may be included in the imaging range. The image device 13 captures an image of, for example, each side surface (specifically, a surface of a side wall) of the engine 21, the torque converter 22, and the automatic transmission 23. Engine oil and liquid refrigerant circulate through the engine 21. The liquid refrigerant may be cooling water or long life coolant (LLC). Lubricating oil such as automatic transmission fluid (ATF) circulates through the torque converter 22 and the automatic transmission 23.

Although details will be described later, the image processing apparatus 100 acquires a captured image that is an image captured by the image device 13. The image processing apparatus 100 detects liquid leakage occurring in any of the engine 21, the torque converter 22, and the automatic transmission 23 by executing various types of image processing. In the case of the engine 21, the liquid leakage may be engine oil or liquid refrigerant. Therefore, when liquid leakage is detected, the image processing apparatus 100 determines the liquid type of the liquid leakage, and displays the determination result on the display device 12 as needed. For example, the image processing apparatus 100 displays the liquid type such as engine oil or LLC on the display device 12 together with the captured image including the liquid leakage.

Figure 2:
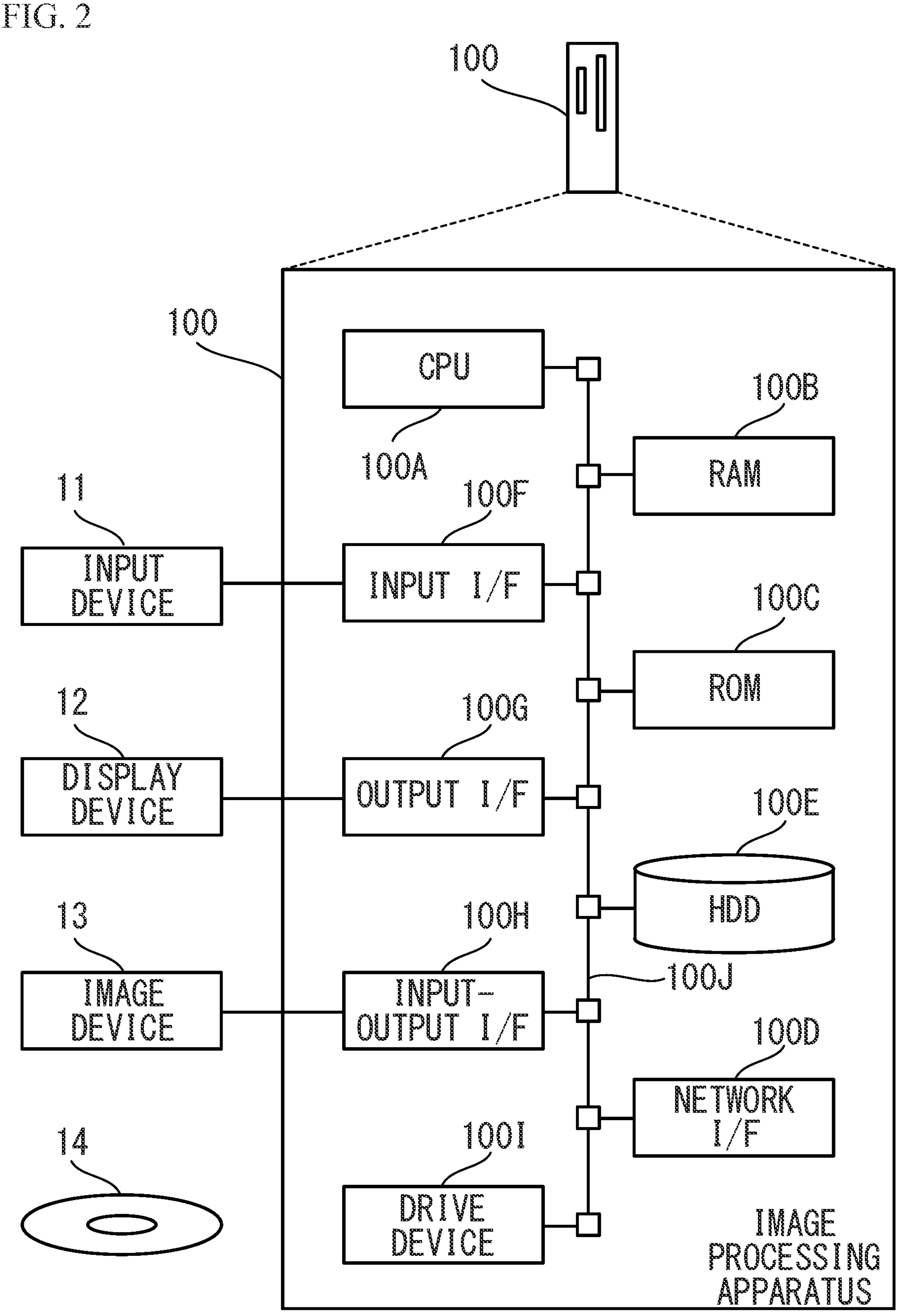
FIG. 2 is an example of a hardware configuration of an image processing apparatus.

Next, a hardware configuration of the image processing apparatus 100 will be described with reference to FIG. 2. The image processing apparatus 100 includes a central processing unit (CPU) 100A as a processor, and a random access memory (RAM) 100B and a read only memory (ROM) 100C as memories. The image processing apparatus 100 includes a network interface (I/F) 100D and a hard disk drive (HDD) 100E. Instead of the HDD 100E, a solid state drive (SSD) may be used.

The image processing apparatus 100 may include at least one of an input I/F 100F, an output I/F 100G, an input-output I/F 100H, and a drive device 100I as necessary. The CPU 100A to the drive device 100I are connected to each other by an internal bus 100J. That is, the image processing apparatus 100 is achieved by a computer.

The input device 11 is connected to the input I/F 100F. The display device 12 is connected to the outputs I/F 100G. The image device 13 is connected to the input-output I/F 100H. In a case where the image processing apparatus 100 includes a plurality of the input-output I/Fs 100H, a memory may be connected to the input-output I/F 100H. Examples of the semiconductor memory include a universal serial bus (USB) memory and a flash memory. The input-output I/F 100H reads a predetermined program stored in the memory. The input I/F 100F and the input-output I/F 100H comprise, for example, USB ports. The output I/F 100G comprises for example a display port.

A portable recording medium 14 is inserted into the drive device 100I. Examples of the portable recording medium 14 include a removable disk such as a compact disc (CD)-ROM and a digital versatile disc (DVD). The drive device 100I reads a predetermined program recorded on the portable recording medium 14. The network I/F 100D includes, for example, a local area network (LAN) port and a communication circuit.

A predetermined program stored in at least one of the ROM 100C, the HDD 100E and the semi-conductor memory is temporarily stored in the RAM 100B by the CPU 100A. The predetermined program recorded on the portable recording medium 14 is temporarily stored in the RAM 100B by the CPU 100A. When the CPU 100A executes the stored predetermined program, the CPU 100A realizes various functions to be described later and executes various processes to be described later. The predetermined program may correspond to a flowchart to be described later.

Figure 3:
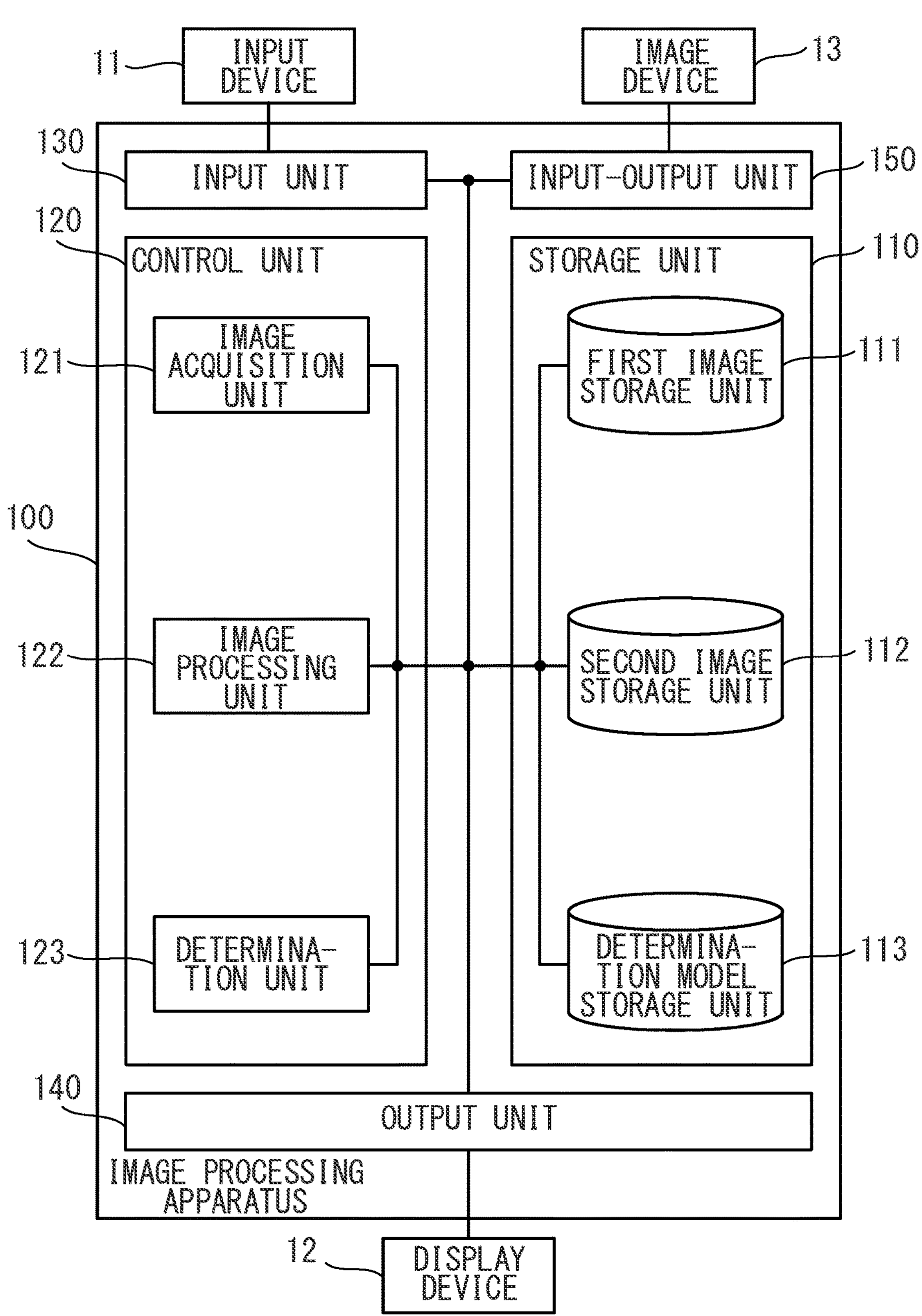
FIG. 3 is an example of a functional configuration of an image processing apparatus.

The functional configuration of the image processing apparatus 100 will be described with reference to FIGS. 3 to 5. FIG. 3 illustrates a main part of the functions of the image processing apparatus 100.

As illustrated in FIG. 3, the image processing apparatus 100 includes a storage unit 110, a control unit 120, an input unit 130, an output unit 140, and an input/output unit 150. The storage unit 110 is achieved by the above-described the RAM 100B, the HDD 100E, or the like. The control unit 120 is achieved by the above-described CPU 100A. The input unit 130 is achieved by the input I/F 100F described above.

The output unit 140 is achieved by the output I/F 100G described above. The input/output unit 150 is achieved by the above-described input-output I/F 100H. Therefore, the storage unit 110, the control unit 120, the input unit 130, the output unit 140, and the input/output unit 150 are connected to one another.

Here, the storage unit 110 includes a first image storage unit 111, a second image storage unit 112, and a determination model storage unit 113. The control unit 120 includes an image acquisition unit 121, an image processing unit 122, and a determination unit 123.

The image acquisition unit 121 acquires a captured image from the image device 13. Here, the image device 13 periodically or continuously captures images of a state before the operation start (or before the start) of the imaging target 20, a state during the operation of the imaging target 20, and a state after the operation end of the imaging target 20, in an imaging range. As a result, the image device 13 generates a moving image or a plurality of still images representing the imaging range as a plurality of time-series captured images. The colors of the captured image are expressed in a red green blue (RGB) format. The image acquisition unit 121 acquires such a captured image from the image device 13.

Figure 4A:
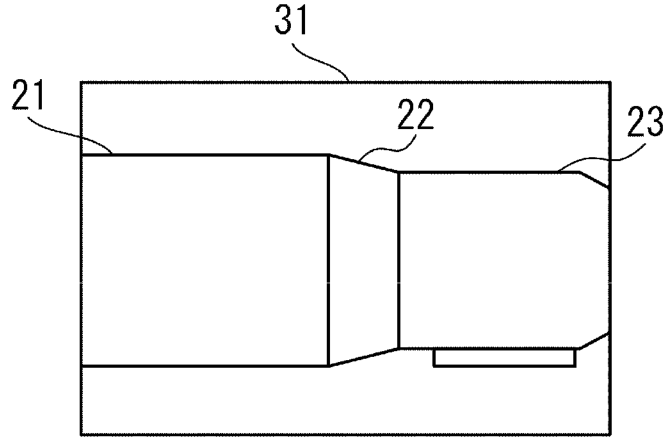
FIG. 4A is an example of a reference image.

When the captured image is acquired, the image acquisition unit 121 cuts out a part of the captured image and analyzes a partial captured image (hereinafter, simply referred to as a partial image) which is a part of the captured image. When it is determined that there is no liquid leakage as a result of analyzing the partial image, the image acquisition unit 121 stores the partial image without liquid leakage in the first image storage unit 111 as the first reference image. Thus, as illustrated in FIG. 4A, the first image storage unit 111 stores a first reference image 31 that does not include liquid leakage. The first reference image 31 may be in any state of a state before the start of operation of the imaging target 20, a state during operation, and a state after the end of operation, as long as liquid leakage is not included. The number of first reference images 31 stored in the first image storage unit 111 may be one or more.

Figure 4B:
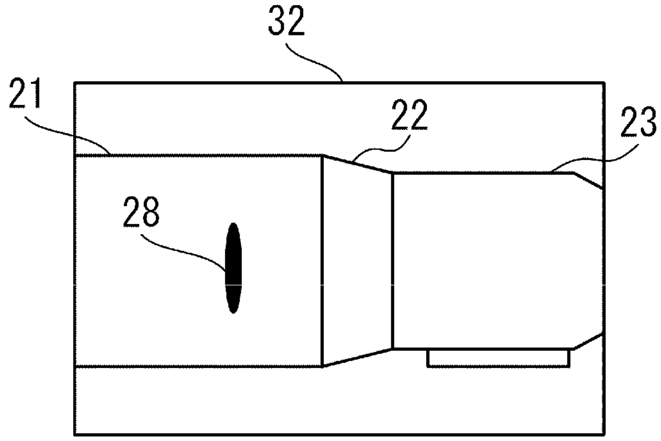
FIG. 4B is an example of a detection target image.

On the other hand, the image acquisition unit 121 stores one of the partial images (for example, the most recent captured image) as a first detection target image in the second image storage unit 112, regardless of the result of analyzing the partial image. Thus, when the image acquisition unit 121 analyzes the partial image and determines that there is liquid leakage on the surface of the imaging target 20, the second image storage unit 112 stores a first detection target image 32 including a liquid leakage 28 as illustrated in FIG. 4B.

The image processing unit 122 acquires the first reference image 31 from the first image storage unit 111. The image processing unit 122 converts the RGB format in which colors of the first reference image 31 are expressed into a hue saturation value (HSV) format on the basis of a conversion method for converting the RGB format of the first reference image 31 into the HSV format. Then, the image processing unit 122 extracts or separates a second reference image (not illustrated) insisting of only the S components (saturation components) from the converted first reference image 31. That is, the H components (hue components) and the V components (brightness components) are excluded. The image processing unit 122 acquires the first detection target image 32 from the second image storage unit 112, and converts the RGB format in which colors of the first detection target image 32 are expressed into the HSV format. Then, the image processing unit 122 extracts or separates a second detection target image (not illustrated) insisting of only the S components from the converted first detection target image 32.

After the separation into the second reference image and the second detection target image is completed, the image processing unit 122 generates a third reference image and a third detection target image by smoothing the second reference image and the second detection target image, respectively. After generating the third reference image and the third detection target image, the image processing unit 122 detects liquid leakage based on a result of comparison between the third reference image and the third detection target image.

Specifically, the image processing unit 122 detects a specific area in which liquid leakage has occurred based on a first background subtraction image. The first background subtraction image is an image obtained as a result of processing using the background subtraction method on the third reference image and the third detection target image. The image processing unit 122 may generate a second background subtraction image by removing noise from the first background subtraction image based on a predetermined noise removal method for removing noise from an image. The image processing unit 122 may detect the specific area in which liquid leakage has occurred based on the second background subtraction image. The predetermined denoising method may employ, for example, one or both of dilation and erosion processing and gray level co-occurrence matrix (GLCM) processing.

The dilation and erosion processing includes dilation processing. The dilation processing is processing for replacing a target pixel with white if at least one white pixel exists around the target pixel (kernel size such as 3×3 pixels), for example. The dilation and erosion processing includes erosion processing. The erosion processing is processing for replacing a target pixel with black if at least one black pixel is present around the target pixel. When the liquid leakage indicated by the specific area indicates the leakage of the engine oil, the specific area appears with a relatively certain area on the image. For this reason, it is assumed that there is a low possibility that the specific area disappears even when the dilation and erosion processing applied to the first background subtraction image. On the other hand, noise appears with a relatively very small area on the image. Therefore, when the dilation and erosion processing is applied to the first background subtraction image, it is assumed that there is a high possibility that noise is removed.

On the other hand, in the GLCM processing, for example, a GLCM is generated from peripheral pixels arranged around a target pixel, and a plurality of texture feature amounts are calculated as characteristic values from the GLCM. Examples of the characteristic value include entropy, dissimilarity, contrast, energy, and the like. Here, in a case where the liquid leakage represented by the specific area represents the leakage of the engine oil, there is a uniform property or a uniform state unlike noise. Therefore, entropy tends to be small, and energy tends to be large. Therefore, in the GLCM processing, such a characteristic value is compared with a predetermined threshold value for extracting the leakage of the engine oil, noise is removed, and the leakage of the engine oil is detected. As described above, the GLCM processing has a feature that a pixel with a low frequency (for example, a noise portion) is hardly detected.

The determination model storage unit 113 stores a learned model as a first determination model. The learned model is a model obtained by machine-learning an oil color image in which the color of oil such as engine oil or ATF is represented in the RGB format and a non-oil color image in which the color of liquid (for example, LLC or cooling water) excluding oil is represented in the RGB format.

Figure 5:
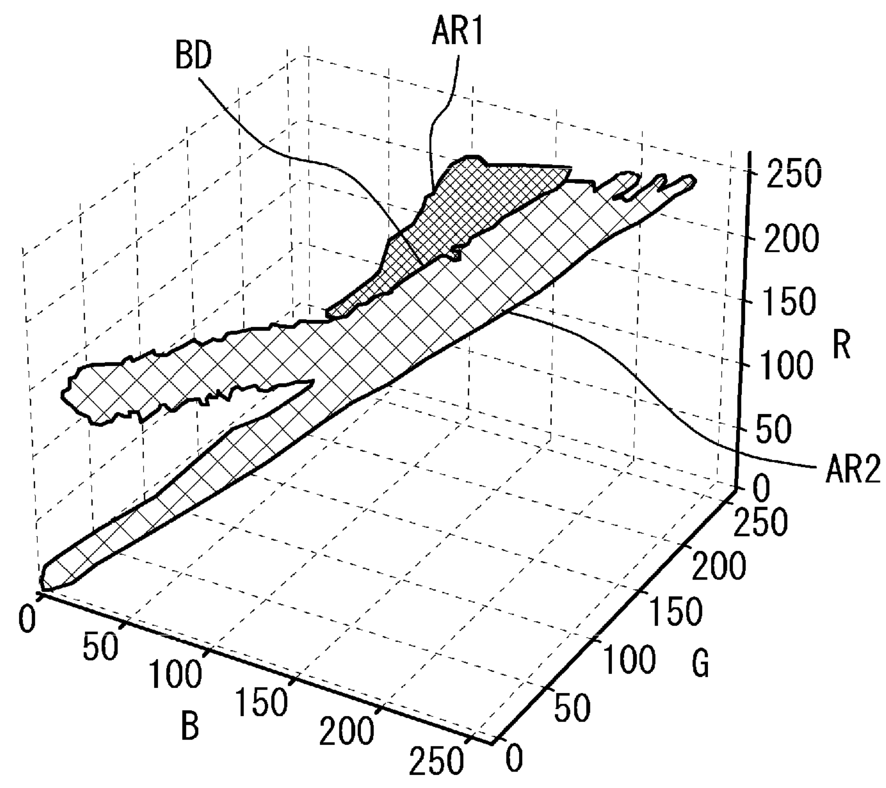
FIG. 5 is an example of a determination model.

As illustrated in FIG. 5, the determination model is represented by a predetermined distribution in a three dimensional space of an R axis, a G axis, and a B axis. The predetermined distribution is divided into two areas by a discrimination boundary BD. For example, a distribution area AR1 represents a set of R values, G values, and B values corresponding to the oil. A distribution area AR2 represents a set of R values, G values, and B values corresponding to the liquid excluding the oil. Each of the R values, the G values, and the B values are 256 gradations. Such a determination model is generated based on a one class support vector machine (OCSVM) and stored in advance in the determination model storage unit 113.

Although not illustrated, the determination model storage unit 113 may store the next learned model as a second determination model. This learned model is a model obtained by machine-learning a refrigerant color representing a color of a liquid refrigerant (for example, LLC or cooling water) in the RGB format and a non-refrigerant color representing a color of a liquid (for example, rainwater or muddy water) excluding the liquid refrigerant in the RGB format.

The determination unit 123 acquires the first determination model from the determination model storage unit 113. The determination unit 123 determines the liquid type of the liquid leakage represented by the specific area, on the basis of the acquired first determination model, the specific area detected by the image processing unit 122, and the first detection target image. In the processing using the background subtraction method or the noise removal processing by the noise removal method by the image processing unit 122, the liquid type may not be accurately determined. Therefore, the determination unit 123 determines whether or not the liquid leakage represented by the specific area is the oil leakage based on the first determination model, the specific area, and the first detection target image. In this way, by using the first determination model, it is possible to accurately determine the liquid type. The determination unit 123 may acquire the second determination model and determine whether the liquid leakage indicated by the specific area is the leakage of the liquid refrigerant.

Next, processing executed by the control unit 120 will be described with reference to FIGS. 6, 7A, and 7B.

Figure 6:
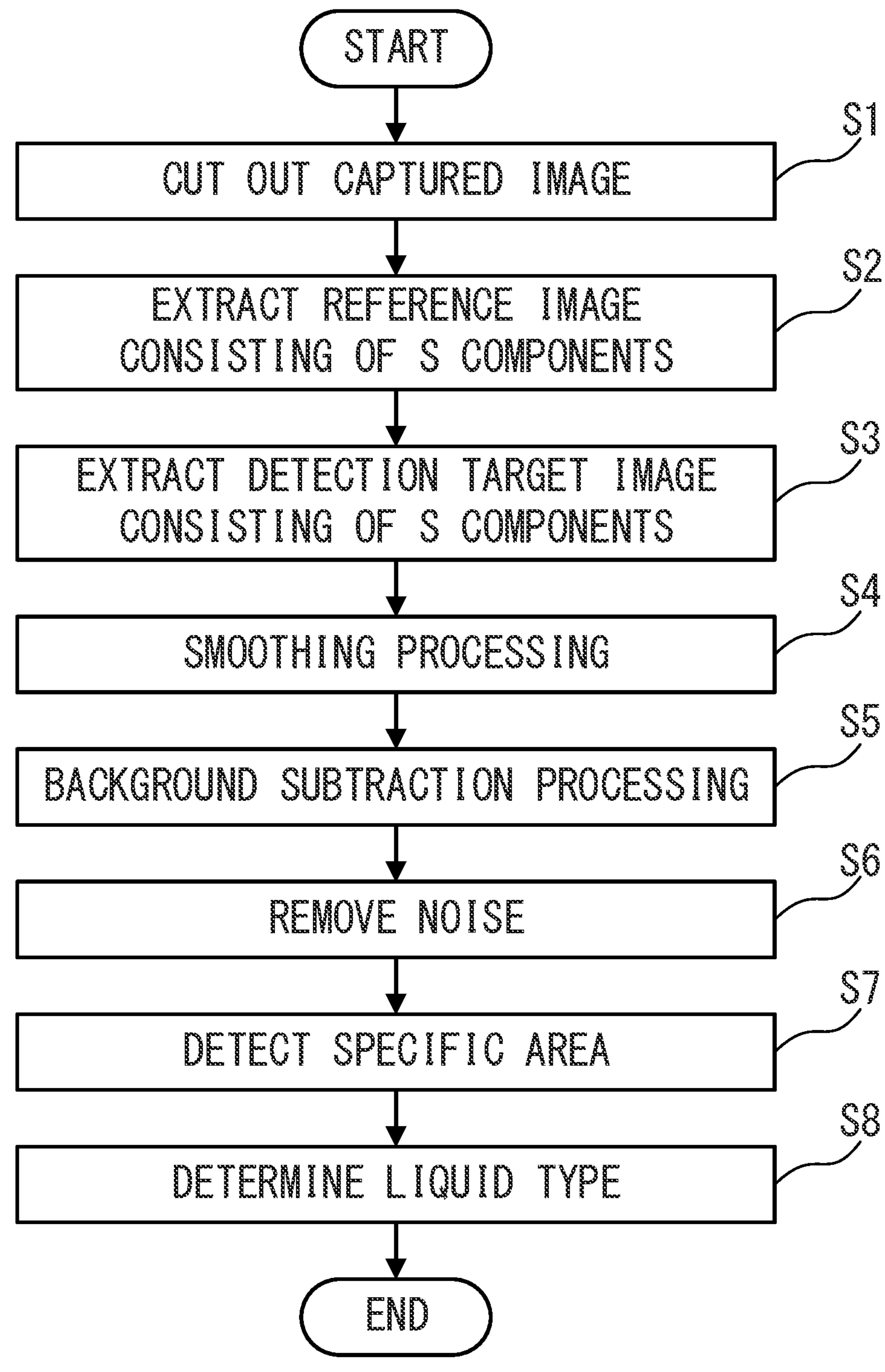
FIG. 6 is a flowchart illustrating an example of processing executed by a control unit.
Figure 7A:
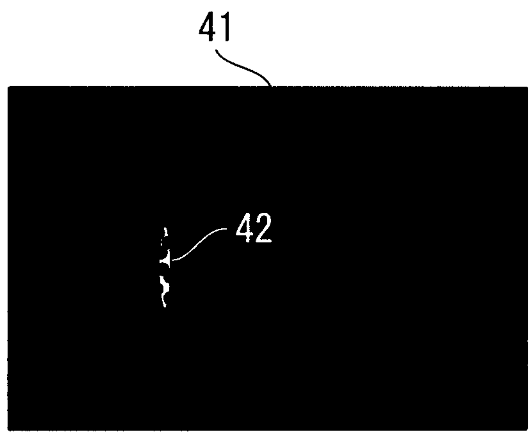
FIG. 7A is an example of a background subtraction image according to a comparative example.
Figure 7B:
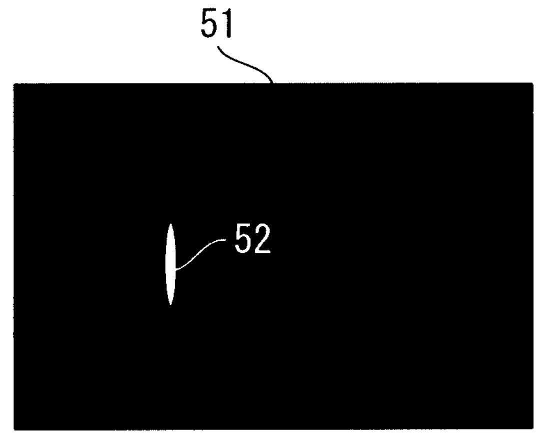
FIG. 7B is an example of a background subtraction image according to an embodiment.

First, as illustrated in FIG. 6, the image acquisition unit 121 cuts out a captured image (step S1). Specifically, the image acquisition unit 121 acquires a captured image from the image device 13, cuts out a part of the captured image, and analyzes a partial image. When it is determined that there is no liquid leakage as a result of analyzing the partial image, the image acquisition unit 121 stores the partial image without liquid leakage in the first image storage unit 111 as the first reference image. In addition, the image acquisition unit 121 stores one of the partial images as the first detection target image in the second image storage unit 112, regardless of the result of analyzing the partial images.

When the processing of step S1 ends, the image processing unit 122 acquires the first reference image from the first image storage unit 111, converts the RGB format of the first reference image into the HSV format, and extracts the second reference image consisting of only the S components from the first reference image in which colors are expressed in the HSV format (step S2). When the processing of step S2 ends, the image processing unit 122 acquires the first detection target image from the second image storage unit 112, converts the RGB format of the first detection target image into the HSV format, and extracts the second detection target image consisting of only the S components from the first detection target image in which colors are expressed in the HSV format (step S3).

When the processing of step S3 ends, the image processing unit 122 executes a smoothing processing on each of the second reference image and the second detection target image (step S4). By executing the smoothing processing, the image processing unit 122 generates a third reference image obtained by smoothing the second reference image and a third detection target image obtained by smoothing the second detection target image. The smoothing processing is, for example, processing of replacing each pixel with an average value of peripheral pixels to remove a noise component. The smoothing processing reduces a sharp change in saturation in the image. Therefore, when the liquid leakage represents the leakage of the engine oil, it is assumed that the noise portion becomes thin, but the oil portion having a uniform property or state hardly changes. The uniform property or state refers to, for example, a flat property or state.

When the processing of step S4 ends, the image processing unit 122 executes the background subtraction processing based on the third reference image and the third detection target image (step S5). Regarding the first background subtraction image based on the third reference image and the third detection target image, the background subtraction processing according to the present embodiment is processing for outputting a white pixel when a saturation difference between the target pixel and the peripheral pixel is equal to or greater than a threshold value and for outputting a black pixel when the saturation difference is less than the threshold value.

For example, the image processing unit 122 executes the background subtraction processing in which a white pixel is output when a luminance difference between the target pixel and the peripheral pixel is equal to or greater than a threshold value and a black pixel is output when the luminance difference is less than the threshold value. As a result, as illustrated in FIG. 7A, the detection accuracy of a specific area 42 appearing in a background subtraction image 41 decreases. Thus, the liquid type may not be accurately determined in the subsequent processing. However, in the background subtraction processing according to the present embodiment, as illustrated in FIG. 7B, the detection accuracy of a specific area 52 appearing in a background subtraction image 51 is improved. As a result, when the liquid type is determined in the subsequent processing, it is possible to accurately determine the liquid type.

When the processing of step S5 ends, the image processing unit 122 removes noise from the background subtraction image based on a predetermined noise removal method (step S6). Specifically, the image processing unit 122 generates a noise-removed background subtraction image (not illustrated) as a second background subtraction image obtained by removing noise from the background subtraction image 51 as the first background subtraction image.

When the processing of step S6 is completed, the image processing unit 122 detects a specific area based on the noise-removed background subtraction image (step S7). If the liquid leakage has occurred in the imaging object 20, the specific area 52 clearly appears in the noise-removed background subtraction image as described above. Therefore, the image processing unit 122 detects the specific area 52 with high accuracy. By detecting the specific area 52, it is possible to specify an area (region) where the liquid leakage has occurred.

When the processing of step S7 ends, the determination unit 123 determines the liquid type (step S8), and ends the processing. For example, the determination unit 123 acquires the first determination model from the determination model storage unit 113. Then, the determination unit 123 determines whether or not the liquid leakage indicated by the specific area 52 is the oil leakage based on the first determination model, the specific area detected by the image processing unit 122, and the first detection target image. The specific area 52 is accurately detected by the above-described various image processing executed by the image processing unit 122. Therefore, it is possible to determine, with high accuracy, whether or not the liquid leakage indicated by the specific area 52 is oil leakage.

As described above, in the processing of step S2, the image processing unit 122 of the control unit 120 included in the image processing apparatus 100 according to the present embodiment executes processing for converting the RGB format in which colors of the first reference image not including liquid leakage are expressed into the HSV format, and extracting the second reference image consisting of the S components from the first reference image having colors expressed in the RGB format. Next, in the processing of step S3, the image processing unit 122 executes processing for converting the RGB format in which colors of the first detection target image are expressed into the HSV format, and extracting the second detection target image of the S components from the first detection target image having colors expressed in the RGB format. Thereafter, in the processing of step S4, the image processing unit 122 executes processing for generating a third reference image and a third detection target image obtained by smoothing the second reference image and the second detection target image, respectively. Then, in the processing of steps S5 and S7, the image processing unit 122 executes the processing for detecting the liquid leakage 28 based on the comparison result between the third reference image and the third detection target image. By these processing, it is possible to suppress a decrease in detection accuracy of liquid leakage.

Here, in the present embodiment, an example in which liquid leakage on the side surface of the imaging target 20 (for example, the engine 21, the automatic transmission 23, or the like) is detected has been described. A flat-bottomed pan (for example, an oil pan or the like) for receiving liquid may be placed under the imaging target 20, and the liquid accumulated in the pan may be captured by the image device 13. For example, when colorless and transparent kerosene drops from the imaging target 20 to the pan, the kerosene usually drops at one point on the pan and then gradually spreads on the pan. For this reason, a difference between the color of the pan and the color of the kerosene might be hard to appear. Even in such a case, according to the present embodiment, it is possible to suppress a decrease in detection accuracy of kerosene leakage.

Although some embodiments of the present disclosure have been described in detail, the present disclosure is not limited to the specific embodiments but may be varied or changed within the scope of the present disclosure as claimed.

What is claimed is:

1. An image processing apparatus comprising:

a first extractor that converts a red green blue (RGB) format in which colors of a first reference image not including liquid leakage are expressed into a hue saturation value (HSV) format, and extracts a second reference image consisting of S components from the first reference image having colors expressed in the HSV format;

a second extractor that converts the RGB format in which colors of a first detection target image are expressed into the HSV format, and extracts a second detection target image consisting of S components from the first detection target image having colors expressed in the HSV format;

a generator that generates a third reference image and a third detection target image by smoothing the second reference image and the second detection target image, respectively; and a detector that detects the liquid leakage on a basis of a comparison result between the third reference image and the third detection target image, wherein the detector detects a specific area in which the liquid leakage occurs on a basis of a first background subtraction image which is a result of processing using a background subtraction method on the third reference image and the third detection target image, and wherein the detector generates a second background subtraction image by removing noise from the first background subtraction image on a basis of a predetermined noise removal method for removing noise from an image, and detects the specific area in which the liquid leakage occurs on a basis of the second background subtraction image.

2. The image processing apparatus according to claim 1, wherein the detector determines a liquid type of the liquid leakage on a basis of the specific area and of a learned model obtained by machine-learning an oil color representing a color of oil in the RGB format and a non-oil color representing a color of liquid excluding the oil in the RGB format.

3. An image processing apparatus comprising:

a first extractor that converts a red green blue (RGB) format in which colors of a first reference image not including liquid leakage are expressed into a hue saturation value (HSV) format, and extracts a second reference image consisting of S components from the first reference image having colors expressed in the HSV format;

a second extractor that converts the RGB format in which colors of a first detection target image are expressed into the HSV format, and extracts a second detection target image consisting of S components from the first detection target image having colors expressed in the HSV format;

a generator that generates a third reference image and a third detection target image by smoothing the second reference image and the second detection target image, respectively; and a detector that detects the liquid leakage on a basis of a comparison result between the third reference image and the third detection target image, wherein the detector detects a specific area in which the liquid leakage occurs on a basis of a first background subtraction image which is a result of processing using a background subtraction method on the third reference image and the third detection target image, wherein the detector determines a liquid type of the liquid leakage on a basis of the specific area and of a learned model obtained by machine-learning an oil color representing a color of oil in the RGB format and a non-oil color representing a color of liquid excluding the oil in the RGB format, and wherein the detector acquires the first reference image and the first detection target image in which colors are expressed in the RGB format from an imaging device that captures an imaging target through which a liquid circulates, and displays a determination result of the liquid type on a display device.

* * * * *